(12) United States Patent
Rautila et al.

(10) Patent No.: US 6,918,131 B1
(45) Date of Patent: Jul. 12, 2005

(54) SYSTEMS AND METHODS FOR CHARACTERIZING TELEVISION PREFERENCES OVER A WIRELESS NETWORK

(75) Inventors: Heikki Rautila, Espoo (FI); Jussi Rissanen, Helsinki (FI); Erkki Tanskanen, Vantaa (FI)

(73) Assignee: Nokia Corporation, Espoo (FI)

( * ) Notice: Subject to any disclaimer, the term of this patent is extended or adjusted under 35 U.S.C. 154(b) by 955 days.

(21) Appl. No.: 09/612,870

(22) Filed: Jul. 10, 2000

(51) Int. Cl.[7] .............................................. H04N 7/025
(52) U.S. Cl. ........................................ 725/34; 725/35
(58) Field of Search .............................. 725/32, 34, 35, 725/23, 24, 109, 110, 111, 112, 113, 106, 133, 141, 11

(56) References Cited

U.S. PATENT DOCUMENTS

| | | | | |
|---|---|---|---|---|
| 5,036,389 A | * | 7/1991 | Morales ........................ | 725/24 |
| 5,083,272 A | | 1/1992 | Walker et al. ............... | 364/412 |
| 5,415,416 A | * | 5/1995 | Scagnelli et al. ............. | 463/25 |
| 5,442,389 A | * | 8/1995 | Blahut et al. .................. | 725/92 |
| 5,539,822 A | * | 7/1996 | Lett ............................ | 380/211 |
| 5,592,551 A | | 1/1997 | Lett et al. ..................... | 380/20 |
| 5,600,364 A | | 2/1997 | Hendricks et al. ............. | 348/1 |
| 5,673,430 A | * | 9/1997 | Story .......................... | 725/116 |
| 5,694,163 A | * | 12/1997 | Harrison ..................... | 725/110 |
| 5,790,935 A | * | 8/1998 | Payton ........................ | 725/91 |
| 5,812,931 A | | 9/1998 | Yuen ........................... | 455/5.1 |
| 5,831,664 A | * | 11/1998 | Wharton et al. .............. | 725/81 |
| 5,898,919 A | | 4/1999 | Yuen ........................... | 455/420 |
| 5,990,882 A | | 11/1999 | Heinonen et al. ........... | 345/327 |
| 6,133,912 A | * | 10/2000 | Montero ..................... | 345/716 |
| 6,198,478 B1 | * | 3/2001 | Ota et al. .................... | 345/716 |
| 6,357,042 B2 | * | 3/2002 | Srinivasan et al. ........... | 725/32 |
| 6,446,261 B1 | * | 9/2002 | Rosser ........................ | 725/34 |
| 6,530,083 B1 | * | 3/2003 | Liebenow .................... | 725/46 |

FOREIGN PATENT DOCUMENTS

| | | | |
|---|---|---|---|
| EP | 0 837 599 A2 | 4/1998 | |
| WO | WO 97/31476 | 8/1997 | |
| WO | WO 99/04568 | 1/1999 | .......... H04N/7/173 |
| WO | WO 99/42964 | 8/1999 | ........... G07F/17/32 |
| WO | WO 00/05889 | 2/2000 | ............ H04N/7/16 |

* cited by examiner

Primary Examiner—Vivek Srivastava
Assistant Examiner—Dominic Saltarelli
(74) Attorney, Agent, or Firm—Cohen, Pontani, Lieberman & Pavane

(57) ABSTRACT

A system for interacting with viewers of television programming includes a television set and a network terminal for each such user. The terminals are connected by the network to an interactive server which maintains a first database of persistent information for each user and a second database of current preference information for each user. The current preference information includes registrations of users as viewing particular programs or as participating in certain activities chronicled in television programs, such as lotteries, polls, and product promotions. According to information in the first and second databases and according to current user requests, the interactive server forwards information to users' terminals, modifies content of all television programming, or modifies content of television programming targeted to certain users or groups of users for selection by those users' cable or satellite set-top boxes.

6 Claims, 2 Drawing Sheets

SYSTEMS AND METHODS FOR CHARACTERIZING TELEVISION PREFERENCES OVER A WIRELESS NETWORK

BACKGROUND OF THE INVENTION

1. Field of the Invention

This invention relates generally to systems and methods for characterizing television preferences over a computer network. More specifically, the invention relates to characterizing television preferences over the Internet using a wireless device.

2. Description of the Related Art

Wireless communication devices are fast becoming the communications media of choice for transporting data, and communicating data between users of the devices. Many types of wireless devices are currently being used such as cellular phones, wireless telephones, personal digital assistants (PDAs), laptop computers and other devices with small displays which display text and icons to users of the devices. The strong push in current wireless technology development is to use wireless devices for varied applications and which allow users of such devices to seamlessly integrate events and needs in their lives while maintaining adequate communication power to receive and transmit all of the data and information which has an impact on them.

The Internet has also fast become the communications medium of choice for transporting many forms of data, including wireless data, throughout the world. Due to its far-reaching connectivity, the Internet is particularly well-suited to transport an individual's data concerning personal preferences for parameters associated with different systems. In particular, most people have particular preferences for television programming, advertising and other content. There does not exist today a system or method for setting such preferences with a wireless device through the Internet. Such systems and methods would greatly simplify and enhance a user's television viewing habits and make it extremely easy for such habits to be influenced, categorized and exploited by advertisers or other purveyors of television information.

There thus exists a need for methods and systems for characterizing television information related to a user's preferences for programming, advertising and other content. Such systems and methods should be seamlessly integrable with the Internet and usable with existing wireless devices. Moreover, information generated by setting television preferences should be formatted so it can be made available to advertisers, programmers and other providers of television content.

SUMMARY OF THE INVENTION

The present invention characterizes television preferences of an individual using a wireless device which is in communication with a computer network. Preferably, the computer network is the Internet, but the invention may be implemented on any form of computer network such as a local area network (LAN) or wide area network (WAN).

In a preferred embodiment, users equipped with television sets and communication terminals communicate via the Internet with an interactive server that is provided with a television signal. The interactive server maintains a first database containing persistent information regarding each user. The user communicates, through a terminal, current preferences to a second data base in the interactive server such as television program favorites, advertising favorites, hobbies, interests and other specific television preferences which can be characterized by the interactive server. The interactive server is operable to modify television programming being transmitted to the users. In accordance with the first and second databases and with current user requests, the interactive server sends information to users' terminals and modifies television programming. Modification of television programming may consist of modifying the contents of a channel for all users, or appending content to a channel for selective presentation by users' set-top boxes to certain users.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals identify similar elements throughout the several views.

DETAILED DESCRIPTION OF THE PREFERRED EMBODIMENTS

Figure 1:
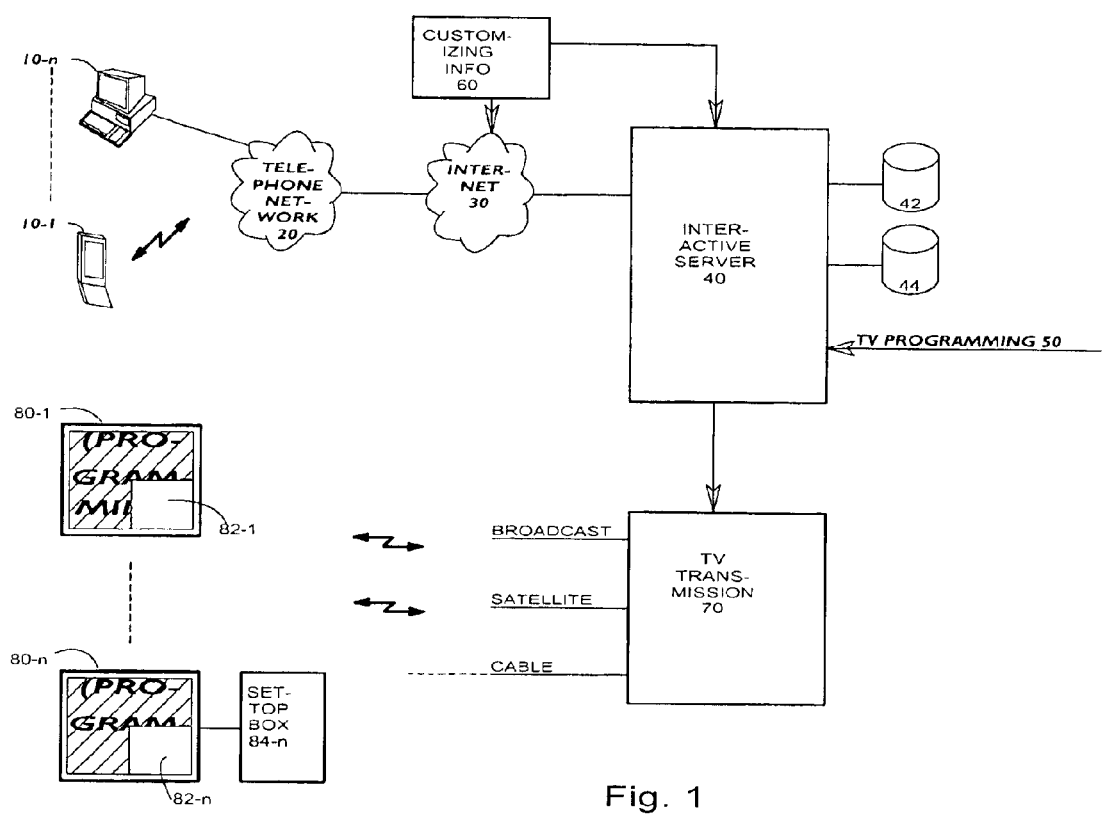
FIG. 1 is a block diagram of a system for characterizing a user's television preferences with a wireless device over the Internet.

Referring now to FIG. 1, a block diagram of a system for setting a user's television programming preferences is depicted. It will be appreciated that the present invention is applicable to customizing other media content such as radio, jukeboxes, movies and other media. For convenience throughout, the media will be referred to as television content, programming, or signals.

There is a plurality of users, each equipped with a terminal 10 and a television set 80. (The dotted lines from XX-1 to XX-n connote plurality of an unspecified (open-ended) number.) The terminals 10 may be any devices capable of communicating via the Internet. Thus they may be personal computers (PCs) or they may be devices such as wireless telephones, personal data assistants (PDAs), palmtop computers, etc. It is likely that new types of terminal devices will be devised in the future that will be usable as terminals in conjunction with the present invention. Each of terminals 10 can communicate with the Internet 30, typically though not necessarily through telephone network 20 which may include the PSTN, the wireless telephone network, ISDN lines, DSL lines, etc. The terminals 10 may communicate with the Internet 30 bidirectionally. (In FIG. 1, interconnecting lines without arrowheads are bidirectional.)

Each user also has a television set 80. Television sets may receive television signals in a variety of ways, such as broadcast, cable, or satellite. A television set equipped to receive cable or satellite signals typically has associated with it a set-top box 84, which, as is known in the art, can interact with the incoming signal for channel selection and the like. Typically, each television set 80 has provision to display supplementary material (i.e., material in addition to the normal programming on a channel) in a small window 82, such that the normal programming is substantially visible while supplementary material is displayed in the window 82. Alternatively, supplementary material may be displayed superimposed on the normal programming, in the manner of movie subtitles.

Users at terminals 10 communicate via the Internet with interactive server (IS) 40. Associated with IS 40 are databases 42 for storing user account information and 44 for storing user registration information. Generally, account information includes persistent information such as a user's name, sex, age/date of birth, address, credit card numbers, general likes and dislikes, hobbies, and so forth, while registration information includes volatile information such as that the user is currently viewing a particular program, that she wishes to participate in a current poll or special offer mentioned on a television program, or the like.

IS 40 receives TV programming 50, which IS 40 will forward for transmission to television sets 80. As will be discussed below, the TV programming 50 may be modified or augmented prior to such forwarding in accordance with the present invention.

IS 40 also receives customizing information 60, which may include advertisements, announcements of polls and candidate lists for polls, product information, special offers, lottery statistics, lottery results, etc. As a design choice, customizing information 60 may be provided to IS 40 directly from some source proximate to IS 40, remotely via the Internet (as from a remote web server) or any combination of the two.

Several scenarios will now be discussed in which the present invention enables users, by registering with IS 40 through their terminals 10, to exert some control over what appears on their TV sets 80.

Simpler scenarios involve those of TV sets 80 that receive TV programming via broadcast; these TV sets must display everything contained in the received signal on a selected channel, as opposed to those of TV sets 80 that receive satellite or cable signals and process them in a set-top box 84 which allows selections to be culled from the received signal on a selected channel.

A user watching via broadcast a particular program, here called Program-A by way of reference, can use her terminal 10 communicate to IS 40 that she is watching Program-A. She is said to have "registered" as watching Program-A. Some identification contained in the message from terminal 10, such as a wireless phone number or an email address, identifies her account in database 42, from which demographic information (e.g., her sex and age) are extracted. (In an alternative embodiment, such demographic information may be part of the message sent from terminal 10, perhaps from a template stored therein.) The registration (including demographics) is stored in registration database 44. It is a design choice when to remove registration entries from registration database 44; for example a registration stating that a user is watching a particular program can be removed when that program is over; a registration stating that a user wishes to participate in a poll may be removed when the poll is completed, plus some predetermined time during which participants may review poll results.

Periodically, a function in IS 40 reviews registrations 44 to deduce demographic patterns. For example, it may be found that more females aged 17 to 30 are watching Program-A than any other single demographic group. IS 40 might then elect to replace the advertisements contained on the corresponding channel in TV programming 50 with advertisements more appropriate to females aged 17 to 30. These other more appropriate advertisements would have been obtained by IS 40 as part of customizing information 60. Thus, everyone watching Program-A, regardless of whether receiving it via broadcast, cable, or satellite, will see the substituted advertisements in lieu of those provided in the TV programming 50 stream.

Figure 2:
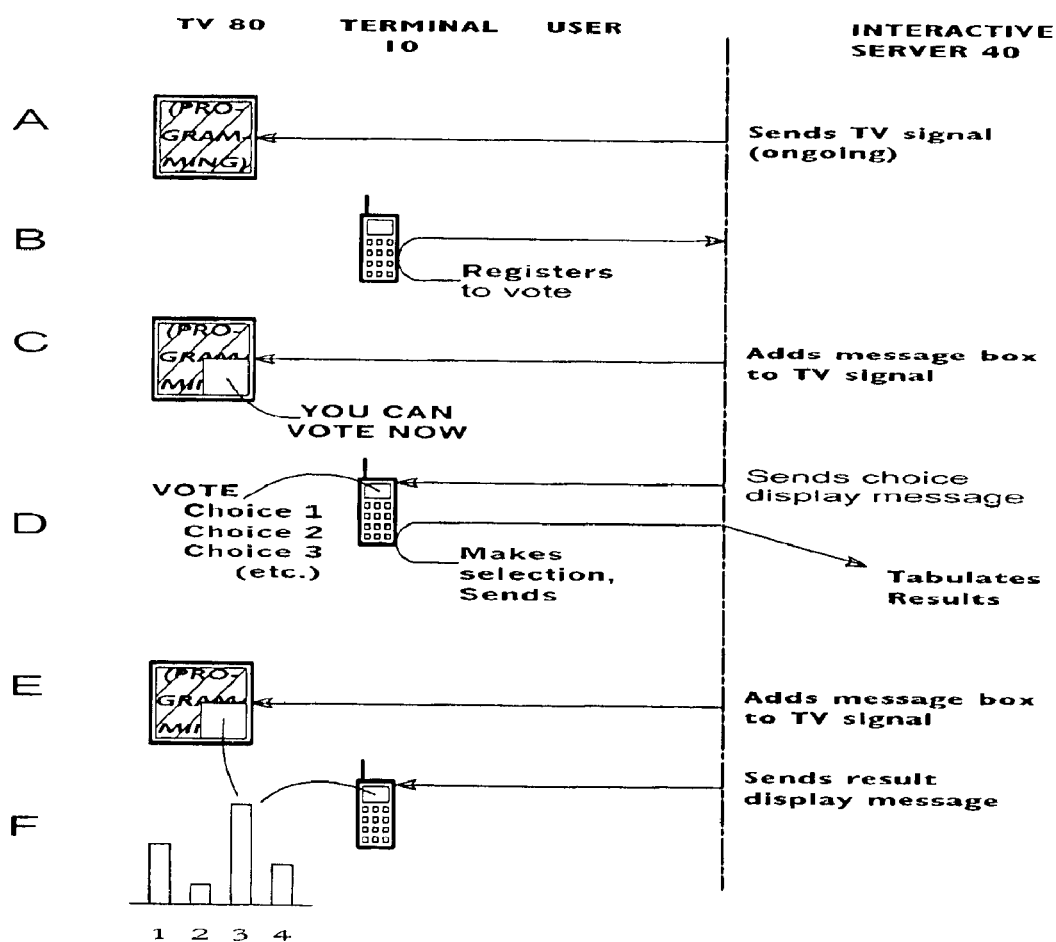
FIG. 2 is a high-level flow diagram depicting a typical scenario in which the system of FIG. 1 is deployed to effect interaction of a television viewer with television content.

Another scenario within the capabilities of broadcast TV reception is illustrated in FIG. 2. Line A indicates that a user is watching a particular program (again called Program-A). Line B indicates that at the same time the user's terminal 10 is displaying a menu, one of the selections on which is "VOTE". In Program-A it is announced that viewers will be polled for their views on some topic presented in Program-A. The user may register to vote in the poll. At some time later (allowing time for all who wish to register to do so) IS 40 adds content to the TV programming to cause each user's TV set to display in a small window (while Program-A remains substantially visible) a legend indicating that actual voting has commenced, as indicated in line C of FIG. 2. (All viewers via broadcast of Program-A see this, regardless of whether they have registered to vote.) The length of time the legend is left on is a design choice. Only those who have registered to vote (determined by polling the voting registrations in registrations database 42) receive a voting menu on their terminals 10 from IS 40 via Internet 30, as indicated on line D of FIG. 2. The user makes a selection and sends IS 40 a message containing the selection. After a reasonable period of time for voting to take place, (optionally announced by legends added to the TV programming, e.g., "VOTING ENDS IN n MINUTES") IS 40 can check to see that no user has voted more than once, and then tabulate the results. The results are then sent to TV sets 80 (seen by everyone watching Program-A) and to the terminals 10 of only those users who registered to vote, as shown lines E and F respectively of FIG. 2.

A scenario that can have different results according to whether a user is receiving TV via broadcast or through a set-top box from cable or satellite is now addressed. A user is watching a particular program (Program-B), and registers as watching Program-B. She may be interested in a product that is advertised during Program-B, and may make an entry via her terminal 10 requesting further information about the product. One simple response would be to obtain the user's email or postal mail address, perhaps from accounts database 42, and to mail the user more information about the product. Providing additional information immediately via the user's TV set 80 is not feasible if the user is receiving via broadcast, because the additional information appended to the broadcast TV signal would be seen by all viewers of Program-B. But if the user is receiving via cable or satellite through a set-top box 84 it may be possible (according to the specifics of the cable or satellite transmission method, as is known in the television arts) to append the additional information to the television signal in such a manner that only the intended user's set-top box extracts it from the signal and displays it to the user. Or if several users have requested additional information on the same advertised product, they may receive it for viewing simultaneously while users who have not requested it do not see it.

The ability of set-top box 84 to extract signals for particular users can be used with the present invention for tailoring advertisements to demographic groups of users. While the basic set of advertising on a channel can be according to the dominant demographic group of viewers as discussed above, user account data 42 and user registration data 44 are interrogated to determine other significant areas of interest among users, and advertisements or special offers targeted accordingly to specific groups are appended to the signal with sufficient destination information that set-top boxes 84 show the alternative advertisements or special offers to target users.

While an advertisement, product information, a special offer, or the like is being presented to a user, the user could enter a BUY indication on her terminal 10. IS 40 determines what product the user was viewing at the time (different users could be seeing different products). IS 40 retrieves the user's shipping information and credit card number from accounts database 42 and arranges to ship the advertised or offered item to the user.

Customizing information 60 may introduce special offers in conjunction with TV programming content as well as in conjunction with advertising. For example, while registered to view a drama program, a user receives from IS 40 a message on her terminal 10 (accompanied by an audible signal such as a beep to draw her attention) that says, e.g., "BUY THE DRESS MELANIE IS WEARING—ONLY $99" (where Melanie is one of the characters in the drama program).

Lotteries provide another area of application for the present invention. A user signifies on her terminal 10 that she wishes to participate in a lottery (perhaps in response to advertisements or prompts for the lottery included in television programming). If participation in more than one lottery is possible, IS 40 sends a menu back to the user's terminal 10 for selection of one lottery. The user is then prompted to enter her selection of lottery numbers.

The user's selection of lottery numbers is forwarded to IS 40, which registers the user as participating in registrations database 44, and which determines the user's financial account number from accounts database 42. Administration of the lottery might be performed in IS 40, but more typically is performed in some other web server (not shown) accessible through the Internet 30. IS 40 forwards the user's selected lottery numbers to the lottery administration function, and sends a display message back to the user's terminal 10 confirming participation in the lottery and debiting of the user's account.

At a later time when the winning lottery numbers have been selected, the winning numbers might appear appended to television programming, and each user participating (as determined from registrations database 44) receives from IS 40 on her terminal 10 a message personalized according to her individual results (e.g., "YOU HAVE WON $50,000,000" or "TWO NUMBERS MATCH—NO WINNINGS", etc.).

A user entering the lottery may send a request to see the most commonly selected numbers. (Such a function might be a menu item on the aforementioned display that is provided to prompt the user to enter lottery numbers.) IS 40, upon receiving such a request, interrogates the lottery administration function and forwards a message for display on the terminals 10 of all users who have requested to view the most-selected numbers. Such a display might typically be in the form of a histogram, depicting a line associated with each of several numbers, the relative line length indicating the popularity of the number. If IS 40 detects that a large number (i.e., above some predetermined threshold) of users request to see the most commonly selected numbers, IS 40 will append a display thereof to television programming.

The present invention permits chatting among members of a community. For example, users registered as watching a particular program may enter on their terminals 10 comments about the program. These comments are forwarded by IS 40 for display on the terminals 10 of other users registered as watching that program, as determined from registrations database 44. Also, IS 40 can cause the comments to appear in the window 82 of TV set 80 of users viewing the program through a suitable set-top box.

A user wishing to view television programming in a different language can benefit from the present invention. Such a user registers as watching the program, and requests subtitles in another language. If such subtitles are not available, the user is so informed. If they are available, IS 40 appends them to a satellite or cable transmission of the program for extraction by the user's set-top box 84 and subsequent display to the user on his TV set 80. In the alternative, an audio soundtrack in the requested language can be fed to the user's terminal 10. The user is billed for this service through an account determined from accounts database 42.

Thus, the inventive methods and systems provide a simple and efficient mechanism for setting a user's preferences for viewing television content. By using a wireless device and the Internet, a quick modality for communicating preferences is accomplished and standard equipment may be used to perform the required functions. This allows the inventive methods and systems to be implemented economically and with little development costs. Moreover, customized or preferred services may be provided to the user by the broadcaster in view of the preferences selected by the user. These results have not heretofore been achieved in the art.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

We claim:

1. A method of providing interactive video and data displays to each of a plurality of users, each having a television receiver and a data terminal, in accordance with information provided by each user through a data terminal, comprising the steps of:

maintaining, in association with a network server, a first database of information for each user including at least one of identification, address information, financial information, general preference information, and demographic information;

receiving in the network server from user data terminals over the network and maintaining in a second database, for each user, registration information indicating current activity and current preference information;

at least one of:

modifying content of television programming according to current content of said first database and said second database; and sending a message from the network server over a network for display on a user's terminal, wherein the current preference information provided by a user includes a request to learn the most commonly selected numbers in a lottery, and wherein the network server obtains the most commonly selected lottery numbers; and forwards a message to the requesting user terminal for displaying said most commonly selected lottery numbers.

2. The method according to claim 1, wherein the message for displaying said most commonly selected lottery numbers displays in the form of a histogram.

3. The method according to claim 1, wherein if the number of users requesting to learn said most commonly selected lottery numbers exceeds a predetermined threshold, the network server appends a display of said most commonly selected lottery numbers to television programming.

4. A method of providing interactive entertainment to a plurality of users, each having a television receiver for receiving program information from a service through a first communication path and a terminal connectable to the service through a two-way communication path, said method comprising the steps of:

transmitting television programs to the receivers through the first communication path;

logging a user into a network server associated with the service through the two-way communication path using the terminal;

informing said server of user preferences using the terminal;

determining, by said server, that a demographic group of users is logged onto said server based on information received by said two-way communication path and the user preferences of users that are currently logged onto the network server by the terminals;

controlling in said network server, according to user preferences of said demographic group of users, transmission of at least one of program content and first supplemental information pertaining to a program to the television receivers of at least the users in said demographic group of users; and displaying, by said television receivers of at least the users in said demographic group of users, a video and data display based on the at least one of program content and first supplemental information transmitted over the first communication path and subjected to control by said network server;

maintaining, in association with the network server, a first database of information for each user including at least one of identification, address information, financial information, general preference information, and demographic information;

wherein said step of logging a user into a network server comprises receiving in the network server from user data terminals over the network and maintaining in a second database, for each user, registration information indicating current activity and current preference information;

wherein said step of displaying a video and data display further comprises at least one of:

modifying content of television programming according to current content of said first database and said second database; and sending a message from the network server over the network for display on a user's terminal, and wherein the current preference information provided by a user includes a request to learn the most commonly selected numbers in a lottery, and wherein the network server obtains the most commonly selected lottery numbers and forwards a message to the requesting user terminal for displaying said most commonly selected lottery numbers.

5. The method according to claim 4, wherein the message for displaying said most commonly selected lottery numbers displays in the form of a histogram.

6. The method according to claim 4, wherein if the number of users requesting to learn said most commonly selected lottery numbers exceeds a predetermined threshold, the network server appends a display of said most commonly selected lottery numbers to television programming.

* * * * *